US009682671B2

(12) United States Patent
Ferrel et al.

(10) Patent No.: US 9,682,671 B2
(45) Date of Patent: Jun. 20, 2017

(54) VEHICLE SYSTEM WITH BATTERY BOOST AND BYPASS CONTROL

(71) Applicant: FORD GLOBAL TECHNOLOGIES, LLC, Dearborn, MI (US)

(72) Inventors: Mark J. Ferrel, Brighton, MI (US); David Anthony Symanow, Plymouth, MI (US); Karin Lovett, Novi, MI (US); Cathleen Tistle, Manchester, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 481 days.

(21) Appl. No.: 14/300,678

(22) Filed: Jun. 10, 2014

(65) Prior Publication Data

US 2015/0353035 A1 Dec. 10, 2015

(51) Int. Cl.

| | |
|---|---|
| ***B60L 11/18*** | (2006.01) |
| ***B60R 16/03*** | (2006.01) |
| ***B60R 16/033*** | (2006.01) |
| ***H02M 3/04*** | (2006.01) |
| ***B60L 11/00*** | (2006.01) |
| *H02M 3/156* | (2006.01) |
| *H02M 1/00* | (2006.01) |

(52) U.S. Cl.

CPC ............ *B60R 16/033* (2013.01); *B60L 11/00* (2013.01); *B60L 11/18* (2013.01); *H02M 3/04* (2013.01); *H02M 3/156* (2013.01); *H02M 2001/007* (2013.01); *Y02T 10/7005* (2013.01); *Y02T 10/7077* (2013.01); *Y02T 10/7225* (2013.01)

(58) Field of Classification Search

CPC ...... B60L 11/00; B60L 11/18; B60L 2210/10; B60L 2210/12; B60R 16/03; B60R 16/033; H02M 3/04; H02M 3/156; H02M 2001/007; Y02T 10/7005; Y02T 10/7072; Y02T 10/7077; Y02T 10/7216; Y02T 10/7225

USPC .................................................. 307/9.1, 10.1

See application file for complete search history.

(56) References Cited

U.S. PATENT DOCUMENTS 7,352,154 B2 * 4/2008 Cook ........................ H02J 1/00 320/116
7,701,079 B2 * 4/2010 O'Gorman ............ B60R 16/023 307/10.1
7,764,044 B2 * 7/2010 Ishikawa ................ B60K 6/445 307/45
7,960,857 B2 * 6/2011 King ................... B60L 11/1816 307/10.1
8,008,801 B2 * 8/2011 Fujino ................. B60L 11/1887 307/10.1
8,274,173 B2 * 9/2012 King ....................... B60L 1/003 307/9.1
8,504,231 B2 8/2013 Kim
8,508,067 B2 8/2013 Song et al.
8,534,400 B2 9/2013 Stanek et al.
8,692,512 B2 * 4/2014 Tanikawa ............ B60L 11/1816 320/109

(Continued)

*Primary Examiner* — Levi Gannon

(74) *Attorney, Agent, or Firm* — Carlson, Gaskey & Olds

(57) ABSTRACT

A vehicle system according to an exemplary aspect of the present disclosure includes, among other things, a DC/DC converter bus adapted to operate at a first voltage set-point and a low voltage battery bus adapted to operate at a second voltage set-point different from the first voltage set-point.

20 Claims, 3 Drawing Sheets

(56) References Cited

U.S. PATENT DOCUMENTS

| | | | | |
|---|---|---|---|---|
| 9,180,782 | B2 * | 11/2015 | Nakamura | B60L 3/04 |
| 2010/0085019 | A1 * | 4/2010 | Masuda | H02J 7/1453 320/152 |
| 2012/0235613 | A1 | 9/2012 | Huang | |
| 2013/0187446 | A1 | 7/2013 | Ferrel et al. | |
| 2013/0234686 | A1 | 9/2013 | Grant et al. | |
| 2014/0076875 | A1 | 3/2014 | Gale et al. | |
| 2014/0084843 | A1 | 3/2014 | Pham et al. | |
| 2014/0265560 | A1 * | 9/2014 | Leehey | B60L 1/003 307/10.1 |
| 2015/0048674 | A1 * | 2/2015 | Mitsugi | B60R 16/033 307/10.1 |
| 2015/0183334 | A1 * | 7/2015 | Bang | B60L 11/1861 307/9.1 |
| 2015/0291052 | A1 * | 10/2015 | Nakazawa | B60L 8/003 320/101 |

* cited by examiner

VEHICLE SYSTEM WITH BATTERY BOOST AND BYPASS CONTROL

TECHNICAL FIELD

This disclosure relates a vehicle system that includes a boost converter for charging a battery and providing a path for the battery to support module loads of a DC/DC converter bus during certain conditions.

BACKGROUND

In general, electrified vehicles differ from conventional motor vehicles in that they are selectively driven by one or more battery powered electric machines. Conventional motor vehicles, by contrast, rely exclusively on an internal combustion engine to drive the vehicle. Electrified vehicles may use the electric machines instead of, or in addition to, an internal combustion engine. The electric machines are typically powered by high voltage batteries.

In some instances, the power supply components of an electrified vehicle are not located in the same locations as their counterparts in a conventional vehicle. For example, due to packaging constraints, the low voltage battery may be packaged a relatively large distance from a DC/DC converter that charges the battery. This remote packaging may complicate charging of the low voltage battery.

SUMMARY

A vehicle system according to an exemplary aspect of the present disclosure includes, among other things, a DC/DC converter bus adapted to operate at a first voltage set-point and a low voltage battery bus adapted to operate at a second voltage set-point different from the first voltage set-point.

In a further non-limiting embodiment of the foregoing vehicle system, a boost converter is disposed between the DC/DC converter bus and the low voltage battery bus and configured to control current flow between the DC/DC converter bus and the low voltage battery bus.

In a further non-limiting embodiment of either of the foregoing vehicle systems, the boost converter includes at least one switch operable to disconnect the DC/DC converter bus from the low voltage battery bus.

In a further non-limiting embodiment of any of the foregoing vehicle systems, the boost converter includes a bypass switch, an energy storage device, a boost switch, and a diode.

Nom In a further non-limiting embodiment of any of the foregoing vehicle systems, the DC/DC converter bus includes a DC/DC converter and at least one module load.

In a further non-limiting embodiment of any of the foregoing vehicle systems, the low voltage battery bus includes a battery.

In a further non-limiting embodiment of any of the foregoing vehicle systems, the first voltage set-point includes a fixed voltage and the second voltage set-point includes a variable voltage.

In a further non-limiting embodiment of any of the foregoing vehicle systems, a control unit is in electrical communication with the DC/DC converter bus and the low voltage battery bus.

In a further non-limiting embodiment of any of the foregoing vehicle systems, the control unit is configured to operate in a charging mode in which the DC/DC converter bus charges a battery of the low voltage battery bus and a support mode in which the low voltage battery bus supports module loads of the DC/DC converter bus.

In a further non-limiting embodiment of any of the foregoing vehicle systems, the vehicle system is part of a low voltage bus of an electrified vehicle.

A vehicle system according to another exemplary aspect of the present disclosure includes, among other things, a battery, a DC/DC converter configured to charge the battery, a boost converter configured to boost voltages from the DC/DC converter and a control unit configured to operate in a charging mode where current flows in a first direction to charge the battery and a support mode where current flows in a second, opposite direction to support a module load.

In a further non-limiting embodiment of the foregoing vehicle system, the battery is a low voltage battery that is part of a low voltage battery bus and the DC/DC converter is part of a DC/DC converter bus.

In a further non-limiting embodiment of either of the foregoing vehicle systems, the module load is part of the DC/DC converter bus.

In a further non-limiting embodiment of any of the foregoing vehicle systems, the boost converter includes a bypass switch that is selectively closed to define a path of the current flow in the support mode.

In a further non-limiting embodiment of any of the foregoing vehicle systems, the boost converter includes a boost switch that is selectively opened and closed to store energy within an energy storage device during the charging mode.

A method according to another exemplary aspect of the present disclosure includes, among other things, incorporating a boost converter into a vehicle system of an electrified vehicle, operating the vehicle system in a charging mode in which a DC/DC converter charges a battery in response to a first condition, and operating the vehicle system in a support mode in which the battery supports at least one module load in response to a second condition.

In a further non-limiting embodiment of the foregoing method, the DC/DC converter is part of a DC/DC converter bus and the battery is part of a low voltage battery bus.

In a further non-limiting embodiment of either of the foregoing methods, the method includes operating the DC/DC converter bus at a fixed voltage set-point and operating the low voltage battery bus at a variable voltage set-point.

In a further non-limiting embodiment of any of the foregoing methods, the method includes disconnecting the DC/DC converter from the battery in response to a third condition.

In a further non-limiting embodiment of any of the foregoing methods, the first condition includes a low state of charge condition of the battery and the second condition includes an overload condition of the DC/DC converter.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a vehicle system that can be operated in either a charging mode in which a DC/DC converter charges a battery, or a support mode in which the battery supports at least one module load of a DC/DC converter bus. The battery of the vehicle system can be charged with a variable voltage via a local boost converter, while the remainder of the vehicle system can operate at a fixed voltage set-point. The boost converter may also allow current to flow in the opposite direction in the event of a DC/DC converter overload and/or completely disconnect the battery from the DC/DC converter bus. These and other features are discussed in greater detail in this disclosure.

Figure 1:
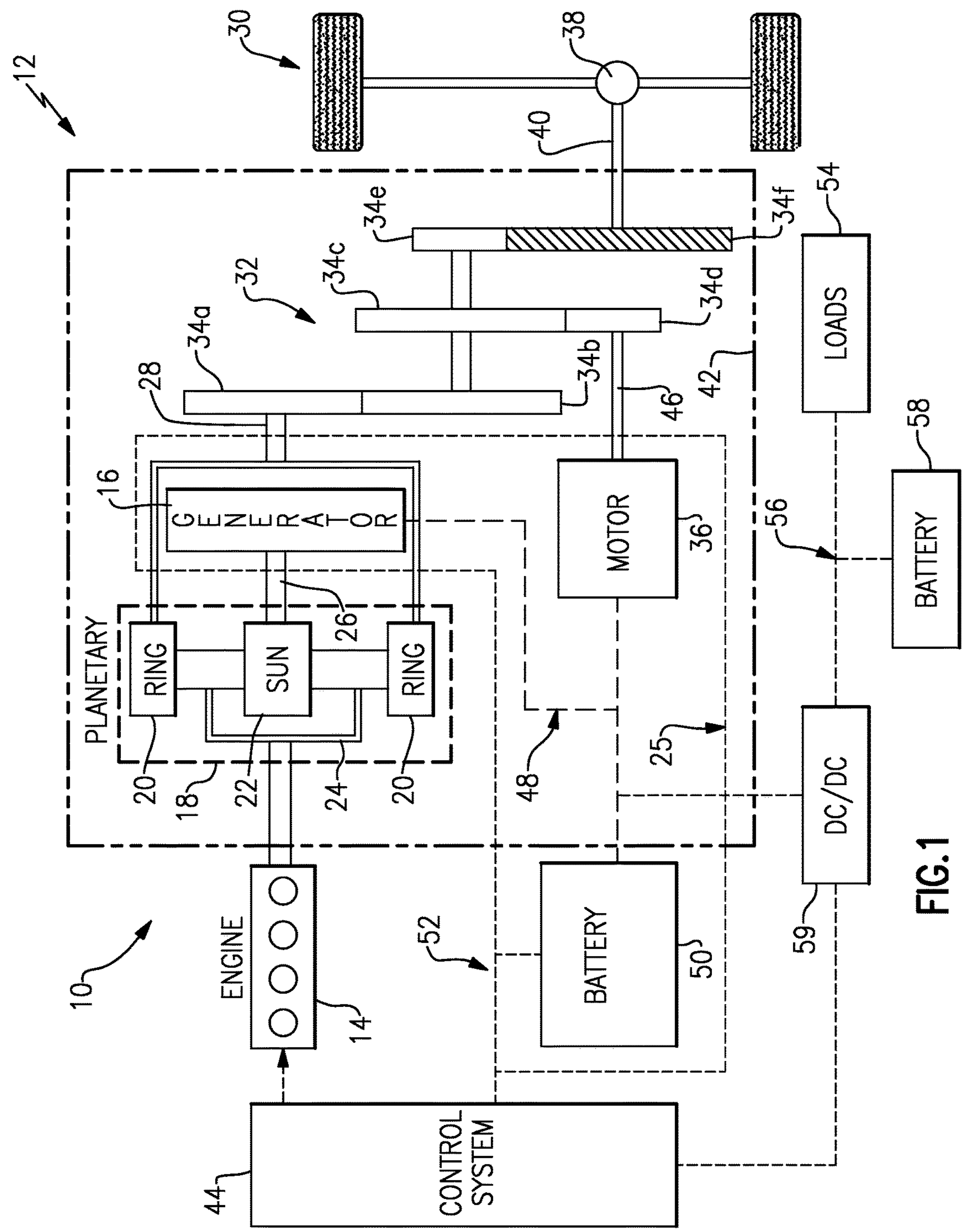
FIG. 1 schematically illustrates a powertrain of an electrified vehicle.

FIG. 1 schematically illustrates a powertrain 10 of an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's), and fuel cell vehicles.

In one embodiment, the powertrain 10 is a power split system that employs a first drive system that includes a combination of an engine 14 and a generator 16 (i.e., a first electric machine) and a second drive system that includes at least a motor 36 (i.e., a second electric machine), the generator 16 and a battery 50. For example, the motor 36, the generator 16 and the battery 50 may make up an electric drive system 25 of the powertrain 10. The first and second drive systems generate torque to drive one or more sets of vehicle drive wheels 30 of the electrified vehicle 12.

The engine 14, such as an internal combustion engine, and the generator 16 may be connected through a power transfer unit 18. In one non-limiting embodiment, the power transfer unit 18 is a planetary gear set. Of course, other types of power transfer units, including other gear sets and transmissions, may be used to connect the engine 14 to the generator 16. The power transfer unit 18 may include a ring gear 20, a sun gear 22 and a carrier assembly 24. The generator 16 is driven by the power transfer unit 18 when acting as a generator to convert kinetic energy to electrical energy. The generator 16 can alternatively function as a motor to convert electrical energy into kinetic energy, thereby outputting torque to a shaft 26 connected to the carrier assembly 24 of the power transfer unit 18. Because the generator 16 is operatively connected to the engine 14, the speed of the engine 14 can be controlled by the generator 16.

The ring gear 20 of the power transfer unit 18 may be connected to a shaft 28 that is connected to vehicle drive wheels 30 through a second power transfer unit 32. The second power transfer unit 32 may include a gear set having a plurality of gears 34A, 34B, 34C, 34D, 34E, and 34F. Other power transfer units may also be suitable. The gears 34A-34F transfer torque from the engine 14 to a differential 38 to provide traction to the vehicle drive wheels 30. The differential 38 may include a plurality of gears that enable the transfer of torque to the vehicle drive wheels 30. The second power transfer unit 32 is mechanically coupled to an axle 40 through the differential 38 to distribute torque to the vehicle drive wheels 30.

The motor 36 can also be employed to drive the vehicle drive wheels 30 by outputting torque to a shaft 46 that is also connected to the second power transfer unit 32. In one embodiment, the motor 36 and the generator 16 are part of a regenerative braking system in which both the motor 36 and the generator 16 can be employed as motors to output torque. The motor 36, the generator 16, the power transfer unit 18, and the power transfer unit 32 may generally be referred to as a transaxle 42, or transmission, of the electrified vehicle 12. Thus, when a driver selects a particular shift position, the transaxle 42 is appropriately controlled to provide the corresponding gear for advancing the electrified vehicle 12 by providing traction to the vehicle drive wheels 30.

The motor 36 and the generator 16 each output electrical power to a high voltage bus 48 and then to the battery 50. In other words, the high voltage bus 48 couples the motor 36 and the generator 16 to the battery 50. The battery 50 may be a high voltage battery that is capable of outputting electrical power to operate the motor 36 and the generator 16. Other types of energy storage devices and/or output devices can also employed by the electrified vehicle 12.

Various accessory module loads 54 may be powered via energy delivered or distributed over a low voltage bus 56. Non-limiting examples of module loads include a radio, CD player, GPS system, lighting, power windows, power seats, cooling fan, wipers, heated seats, heated glass, and/or instrument cluster. The energy required to power the module loads 54 may be provided by a low voltage battery 58, the battery 50 (via the high voltage bus 48), the motor 36 and/or the generator 16.

A power converter, such as DC/DC converter 59, is provided to control the transfer of electrical energy between the high voltage bus 48 and the low voltage bus 56. In this manner, energy from the high voltage bus 48, or energy developed during regenerative braking and delivered to the high voltage bus 48, can be transferred though the DC/DC converter 59 to the low voltage bus 56.

The powertrain 10 may additionally include a control system 44 for monitoring and/or controlling various aspects of the electrified vehicle 12. For example, the control system 44 may communicate with the electric drive system 25, the power transfer units 18, 32, the DC/DC converter 59, or other components to monitor and/or control the electrified vehicle 12. The control system 44 includes electronics and/or software to perform the necessary control functions for operating the electrified vehicle 12. In one embodiment, the control system 44 is a combination vehicle system controller and powertrain control module (VSC/PCM). Although it is shown as a single hardware device, the control system 44 may include multiple controllers in the form of multiple hardware devices, or multiple software controllers within one or more hardware devices.

A controller area network (CAN) 52 allows the control system 44 to communicate with the transaxle 42. For example, the control system 44 may receive signals from the transaxle 42 to indicate whether a transition between shift positions is occurring. The control system 44 could also communicate with a battery control module of the battery 50, or other control devices.

In one non-limiting embodiment, the electrified vehicle 12 has two basic operating modes. The electrified vehicle 12 may operate in an Electric Vehicle (EV) mode where the motor 36 is used (generally without assistance from the engine 14) for vehicle propulsion, thereby depleting the battery 50 state of charge up to its maximum allowable discharging rate under certain driving patterns/cycles. The EV mode is an example of a charge depleting mode of operation for the electrified vehicle 12. During EV mode, the state of charge of the battery 50 may increase in some circumstances, for example due to a period of regenerative braking. The engine 14 is generally not permitted to operate under a default EV mode but could be operated as necessary based on a vehicle system state or as permitted by the operator.

The electrified vehicle 12 may additionally be operated in a Hybrid (HEV) mode in which the engine 14 and the motor 36 are both used for vehicle propulsion. The HEV mode is an example of a charge sustaining mode of operation for the electrified vehicle 12. During the HEV mode, the electrified vehicle 12 may reduce the motor 36 propulsion usage in order to maintain the state of charge of the battery 50 at a constant or approximately constant level by increasing the engine 14 propulsion usage. Although not specifically described here, the electrified vehicle 12 may be operated in other operating modes in addition to the EV and HEV modes.

Figure 2:
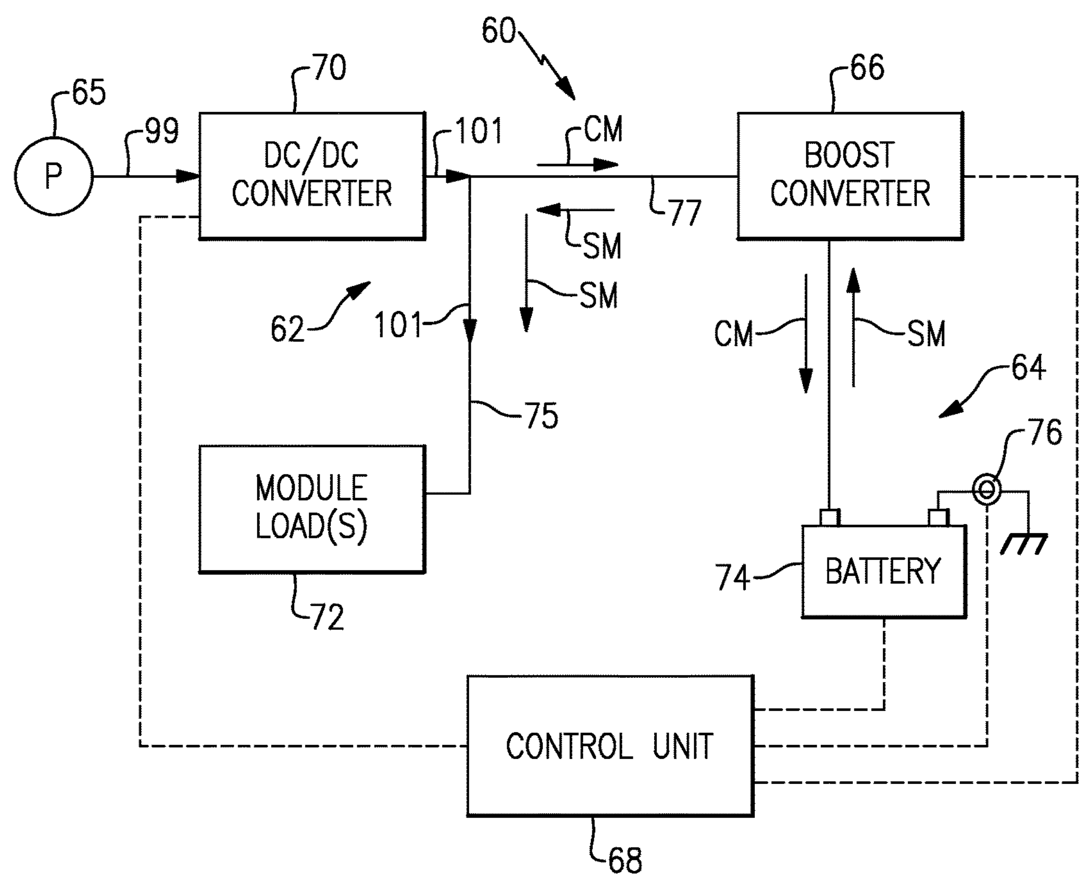
FIG. 2 illustrates a vehicle system of an electrified vehicle.

FIG. 2 schematically illustrates a vehicle system 60 that may be incorporated into an electrified vehicle, such as the electrified vehicle 12 of FIG. 1. In one embodiment, the vehicle system 60 is part of a low voltage bus of an electrified vehicle (see, for example, low voltage bus 56 of FIG. 1).

In one embodiment, the vehicle system 60 includes a DC/DC converter bus 62 and a low voltage battery bus 64. A boost converter 66 is disposed between the DC/DC converter bus 62 and the low voltage battery bus 64. As further discussed below, incorporation of the boost converter 66 permits operation of the DC/DC converter bus 62 at a first voltage set-point and the low voltage battery bus 64 at a second voltage set-point that is different from the first voltage set-point.

The DC/DC converter bus 62 may include a DC/DC converter 70 and one or more module loads 72. The DC/DC converter 70 can receive an input DC voltage 99 having a corresponding input DC current from a power supply 65, such as a battery that operates on a high voltage bus of the electrified vehicle. In one embodiment, the DC/DC converter 70 converts the input DC voltage 99 to a lower output DC voltage 101 having a corresponding DC current that is suitable to power the module loads 72. In other words, the DC/DC converter 70 electrically couples the DC/DC converter bus 62, which is part of a low voltage bus, to a high voltage bus. In one embodiment, the DC/DC converter 70 is adapted to "step-down" the input DC voltage 99 to a lower output DC voltage 101.

The output DC voltage 101 is communicated to the module loads 72 over a connection, such as a wire 75. Various types of module loads 72 may be powered by the output DC voltage 101 communicated from the DC/DC converter 70. The module loads 72 may include one or more of the following accessories: lighting, power windows, power seats, cooling fan, wipers, heated seats, heated glass, instrument cluster, radio, etc. Of course, these loads are provided only as non-limiting examples.

In another non-limiting embodiment, the DC/DC converter bus 62 operates at a fixed voltage set-point of approximately 12 Volts. In other words, the output DC voltage 101 from the DC/DC converter 70 is a fixed voltage suitable to efficiently power the module loads 72.

The low voltage battery bus 64 may include a battery 74. In one embodiment, the battery 74 is a low voltage battery, such as a 12 Volt battery. The battery 74 may be used to start an engine or for various other purposes. A sensor 76 may be electrically connected to a terminal of the battery 74 for monitoring various conditions of the battery 74, including but not limited to its current, voltage, temperature and/or state of charge (SOC).

The boost converter 66 may be disposed between the DC/DC converter 70 and the battery 74. A connection, or wire 77, may extend between the DC/DC converter 70 and the boost converter 66. The boost converter 66 is operable to boost, or "step-up," a voltage received from the DC/DC converter 70 prior to communicating the voltage to charge the battery 74 over a connection or wire 79. The voltage received by the boost converter 66 from the DC/DC converter 70 may be equivalent to the output DC voltage 101.

By incorporating the boost converter 66 into the vehicle system 60, the low voltage battery bus 64 can be operated at a second voltage set-point that is different from the first voltage set-point of the DC/DC converter bus 62 (i.e., a different voltage set-point than is used to power the module loads 72). In one non-limiting embodiment, the voltage set-point of the low voltage battery bus 64 includes a variable voltage. For example, the voltage set-point may vary between 13 Volts and 15 Volts, or some other voltage range, which is suitable to charge the battery 74.

The vehicle system 60 may additionally include a control unit 68. Although shown as a stand-alone component, the control unit 68 could be part of an overall vehicle system control (see, for example, control system 44 of FIG. 1). The control unit 68 may include the necessary hardware and/or software for executing a plurality of interrelated algorithms for controlling the vehicle system 60.

For example, in one non-limiting embodiment, the control unit 68 is programmed to command operation of the vehicle system 60 in either a charging mode or a support mode. In the charging mode, the DC/DC converter 70 charges the battery 74 in response to a first condition. The first condition may be a low SOC condition of the battery 74 that is sensed by the sensor 76. The sensor 76 may communicate a signal representative of the low SOC condition to the control unit 68 for commanding the charging mode. The boost converter 66 boosts the voltage received from the DC/DC converter 70 prior to communicating a charging voltage to the battery 74. A path of the charging mode is schematically illustrated by the arrows labeled "CM" in FIG. 2.

In the support mode, the battery 74 may operate to provide current in the opposite direction to support one or more module loads 72 of the DC/DC converter bus 62 in response to a second condition. In one embodiment, the second condition is an overload condition of the DC/DC converter 70. The DC/DC converter 70 may be monitored by the control unit 68 to determine whether an overload condition has occurred. The boost converter 66 provides a path for the battery 74 to support the module loads 72. A path of the support mode is schematically illustrated by the arrows labeled "SM" in FIG. 2. In one embodiment, the paths for both the charging mode and the support mode extend through the boost converter 66.

Figure 3:
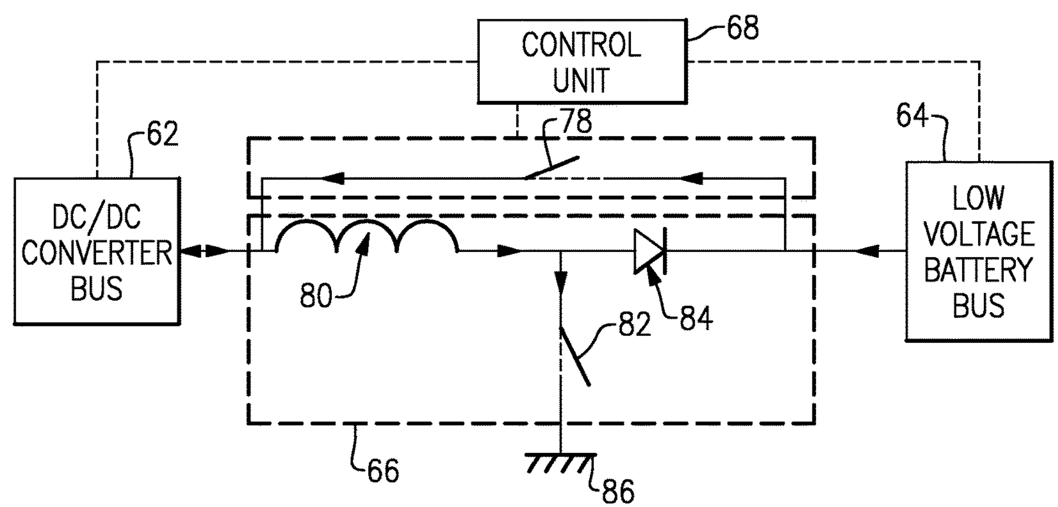
FIG. 3 illustrates a boost converter of a vehicle system.

FIG. 3 illustrates additional details of the boost converter 66 of FIG. 2. In one embodiment, the boost converter 66 includes a first switch 78 (i.e., a bypass switch), an energy storage device 80, a second switch 82 (i.e., a boost switch), and a diode 84 disposed in series connection with the energy storage device 80. The first switch 78, the second switch 82 and the diode 84 may be configured as semiconductor switches. In one embodiment, the energy storage device 80 is implemented as an inductor. However, other devices such as capacitors could additionally or alternatively be employed.

In one embodiment, such as during the support mode described above, the first switch 78 may be closed in order to support module loads by providing current from the low voltage battery bus 64 to the DC/DC converter bus 62. The control unit 68 can command the first switch 78 closed in response to a DC/DC converter overload condition, for example. An open position of the first switch 78 is shown in solid lines and a closed position is shown in dashed lines in FIG. 3. The diode 84 blocks current from being communicated from the low voltage battery bus 64 to the energy storage device 80 (from right to left in FIG. 3) during the support mode. The second switch 82 is typically in an open position (shown in solid lines) during the support mode.

In another embodiment, such as during the charging mode described above, the first switch 78 is opened and the second switch 82 is selectively opened and closed to store energy in the energy storage device 80. In other words, the second switch 82 may be selectively actuated to boost the voltage received from the DC/DC converter bus 62. When the second switch 82 is closed (shown in dashed lines in FIG. 3), current may flow through the energy storage device 80 and energy may be stored in the energy storage device 80 by generating a magnetic field. Conversely, when the second switch is opened (shown in solid lines), current is reduced and the magnetic field previously created will be destroyed to maintain current flow toward the low voltage battery bus 64 for charging a component of the low voltage battery bus 64, such as a low voltage battery.

In yet another embodiment, such as during another condition of the vehicle system 60, the boost converter 66 can be used to completely disconnect the DC/DC converter bus 62 from the low voltage battery bus 64 in order to conserve energy. For example, in a disconnect mode, the control unit 68 may command the first switch 78 open and the second switch 82 closed in order to disconnect the DC/DC converter bus 62 from the low voltage battery bus 64. When the second switch 82 is closed, the current from the energy storage device 80 is provided a path to ground 86 rather than to the low voltage battery bus 64. In one non-limiting embodiment, the disconnect mode is performed during key-off conditions.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

We claim:

1. A vehicle system, comprising:

a DC/DC converter bus adapted to operate at a first voltage set-point;

a low voltage battery bus adapted to operate at a second voltage set-point different from said first voltage set-point; and a boost converter disposed between said DC/DC converter bus and said low voltage battery bus and configured to control current flow between said DC/DC converter bus and said low voltage battery bus.

2. The vehicle system as recited in claim 1, wherein said boost converter includes at least one switch operable to disconnect said DC/DC converter bus from said low voltage battery bus.

3. The vehicle system as recited in claim 1, wherein said boost converter includes a bypass switch, an energy storage device, a boost switch, and a diode.

4. The vehicle system as recited in claim 1, wherein said DC/DC converter bus includes a DC/DC converter and at least one module load.

5. The vehicle system as recited in claim 1, wherein said low voltage battery bus includes a battery.

6. The vehicle system as recited in claim 1, wherein said first voltage set-point includes a fixed voltage and said second voltage set-point includes a variable voltage.

7. The vehicle system as recited in claim 1, comprising a control unit in electrical communication with said DC/DC converter bus and said low voltage battery bus.

8. The vehicle system as recited in claim 7, wherein said control unit is configured to operate in a charging mode in which said DC/DC converter bus charges a battery of said low voltage battery bus and a support mode in which said low voltage battery bus supports module loads of said DC/DC converter bus.

9. The vehicle system as recited in claim 1, wherein said vehicle system is part of a low voltage bus of an electrified vehicle.

10. A vehicle system, comprising:

a low voltage battery;

a DC/DC converter configured to charge said battery;

a boost converter connected between said battery and said DC/DC converter and configured to boost voltages from said DC/DC converter; and a control unit configured to operate in a charging mode where current flows in a first direction to charge said battery and a support mode where current flows in a second, opposite direction to support a module load.

11. The vehicle system as recited in claim 10, wherein said battery part of a low voltage battery bus and said DC/DC converter is part of a DC/DC converter bus.

12. The vehicle system as recited in claim 11, wherein said module load is part of said DC/DC converter bus.

13. The vehicle system as recited in claim 10, wherein said boost converter includes a bypass switch that is selectively closed to define a path of said current flow in said support mode.

14. The vehicle system as recited in claim 13, wherein said boost converter includes a boost switch that is selectively opened and closed to store energy within an energy storage device during said charging mode.

15. The vehicle system as recited in claim 10, wherein said low voltage battery is a 12V battery.

16. A method, comprising:

incorporating a boost converter into a vehicle system of an electrified vehicle;

operating the vehicle system in a charging mode in which a DC/DC converter charges a battery in response to a low state of charge condition of the battery; and operating the vehicle system in a support mode in which the battery supports at least one module load in response to an overload condition of the DC/DC converter.

17. The method as recited in claim 16, wherein the DC/DC converter is part of a DC/DC converter bus and the battery is part of a low voltage battery bus.

18. The method as recited in claim 17, comprising:

operating the DC/DC converter bus at a fixed voltage set-point; and operating the low voltage battery bus at a variable voltage set-point.

19. The method as recited in claim 16, comprising disconnecting the DC/DC converter from the battery in response to a third condition.

20. A vehicle system, comprising:

a battery;

a DC/DC converter configured to charge said battery; and a boost converter connected between said battery and said DC/DC converter and configured to boost voltages from said DC/DC converter, said boost converter including at least one switch operable to selectively disconnect said DC/DC converter from said battery.

* * * * *

UNITED STATES PATENT AND TRADEMARK OFFICE

CERTIFICATE OF CORRECTION

PATENT NO. : 9,682,671 B2
APPLICATION NO. : 14/300678
DATED : June 20, 2017
INVENTOR(S) : Mark J. Ferrel et al.

It is certified that error appears in the above-identified patent and that said Letters Patent is hereby corrected as shown below:

In the Claims

In Claim 11, Column 8, Line 43; after "said battery" insert --is--

Signed and Sealed this
Twenty-ninth Day of August, 2017

Joseph Matal

Joseph Matal
*Performing the Functions and Duties of the*
*Under Secretary of Commerce for Intellectual Property and*
*Director of the United States Patent and Trademark Office*